United States Patent
Urban et al.

(10) Patent No.: US 9,887,770 B2
(45) Date of Patent: Feb. 6, 2018

(54) TRANSCEIVER AND METHOD FOR MONITORING OF SCM TRANSMISSION ON FIBRE CABLE

(71) Applicant: TELEFONAKTIEBOLAGET LM ERICSSON (PUBL), Stockholm (SE)

(72) Inventors: Patryk Urban, Vällingby (SE); Jiajia Chen, Kista (SE); Renan Pereira Almeida, Castanhal (BR)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 15/122,876

(22) PCT Filed: Mar. 3, 2014

(86) PCT No.: PCT/SE2014/050254
§ 371 (c)(1),
(2) Date: Aug. 31, 2016

(87) PCT Pub. No.: WO2015/133939
PCT Pub. Date: Sep. 11, 2015

(65) Prior Publication Data
US 2017/0111111 A1  Apr. 20, 2017

(51) Int. Cl.
*H04B 10/077* (2013.01)
*H04B 10/071* (2013.01)
(Continued)

(52) U.S. Cl.
CPC ....... *H04B 10/0775* (2013.01); *H04B 10/071* (2013.01); *H04B 10/2507* (2013.01); *H04B 17/0085* (2013.01); *H04J 14/0298* (2013.01)

(58) Field of Classification Search
CPC .............. H04B 10/0775; H04B 10/071; H04B 10/2507
See application file for complete search history.

(56) References Cited

U.S. PATENT DOCUMENTS 8,260,140 B2 * 9/2012 Luo ..................... H04J 14/0226
398/70
9,148,228 B2 * 9/2015 Kato .................. H04B 10/2507
(Continued)

FOREIGN PATENT DOCUMENTS

| WO | 2012128677 A1 | 9/2012 |
| WO | 2013002692 A1 | 1/2013 |
| WO | 2015030640 A1 | 3/2015 |

OTHER PUBLICATIONS

Yamamoto, et al., A Novel In-Service Measurement Technique Using the Same Wavelength Band as SCM Signals, Journal of Lightwave Technology, vol. 18, No. 10, Oct. 1, 2000, pp. 1381-1388.
(Continued)

*Primary Examiner* — Dzung Tran (57) ABSTRACT

A first transceiver and a method performed by the first transceiver for monitoring a fiber cable. The first transceiver is connectable to a second transceiver by the fiber cable. The transceivers employ SCM analog modulation where baseband is dedicated for monitoring and the subcarriers are dedicated for data transmission. The method comprises receiving, from a device, at least one electromagnetic data signal to be transmitted towards the second transceiver on the fiber cable, and shifting the at least one data signal in the frequency domain. The method further comprises generating an electromagnetic test signal in a base band, combining the at least one data signal and the generated test signal, and modulating the combined data signal and test signal to respective optical carrier. The method further comprises transmitting the modulated data signal and generated test signal on the fiber cable towards the second transceiver.

13 Claims, 7 Drawing Sheets

(51) Int. Cl.
*H04B 10/2507* (2013.01)
*H04B 17/00* (2015.01)
*H04J 14/02* (2006.01)

(56) References Cited

U.S. PATENT DOCUMENTS

| | | | | |
|---|---|---|---|---|
| 2002/0033977 A1* | 3/2002 | Birk | ........................ | H04J 14/02 398/70 |
| 2012/0163800 A1 | 6/2012 | Urban | | |
| 2014/0016926 A1* | 1/2014 | Soto | ................... | H04B 10/0775 398/16 |
| 2014/0099111 A1* | 4/2014 | Nishihara | ............ | H04B 10/073 398/66 |

OTHER PUBLICATIONS

LV, et al., Simultaneous modulation and transmission of 10-Gb/s baseband and 60-GHz microwave signals in a radio-over-fiber system, Optics Communications, vol. 283, No. 21, Nov. 1, 2010, pp. 4203-4207.

* cited by examiner

Fig. 2e

TRANSCEIVER AND METHOD FOR MONITORING OF SCM TRANSMISSION ON FIBRE CABLE This application is a 371 of International Application No. PCT/SE2014/050254, filed Mar. 3, 2014, the disclosure of which is fully incorporated herein by reference.

TECHNICAL FIELD

The present disclosure relates to supervision of fibre cables and in particular to monitoring a Subcarrier Multiplexing, SCM, analogue modulation transmission on a fibre cable.

BACKGROUND

One of the fundamental requirements for mobile backhaul networks connecting multiple users is reliability. In some networks, different types of material are used for wired links between different entities. Also some networks comprises radio base stations typically outdoor units, together with indoor units and radio heads. These different units may be connected by wire, e.g. fibre cables.

In order to assure reliability, there is a need for a link supervision solution to proactively and reactively monitor link status and quality.

In subcarrier multiplexed, SCM, transmission where several (for example) radio signals related to different operators and/or different radio technologies are provided on separate optical subcarriers, one of the data subcarriers or an idle (dedicated) subcarrier may be assigned to link monitoring purposes.

However, existing techniques for link monitoring based on reflectometry utilize a dedicated optical carrier which implies deployment of an extra laser dedicated only for monitoring purposes. This incurs extra cost for the operator.

SUMMARY

The object is to obviate at least some of the problems outlined above. In particular, it is an object to provide a first transceiver and a method performed by the first transceiver for monitoring a fibre cable is provided. This object and others may be obtained by providing a first transceiver and a method performed by a first transceiver according to the independent claims attached below.

According to an aspect, a method performed by a first transceiver connectable to a second transceiver by a fibre cable, wherein the first and second transceiver employ Subcarrier Multiplexing, SCM, analogue modulation where baseband is dedicated for monitoring and the subcarriers are dedicated for data transmission, for monitoring the fibre cable is provided. The method comprises receiving, from a device, at least one electromagnetic data signal to be transmitted towards the second transceiver on the fibre cable; and shifting the at least one data signal in the frequency domain. The method further comprises generating an electromagnetic test signal in a base band; combining the at least one data signal and the generated test signal; and modulating the combined data signal and test signal to respective optical carrier. The method further comprises transmitting the modulated data signal and generated test signal on the fibre cable towards the second transceiver.

According to an aspect, a first transceiver connectable to a second transceiver by a fibre cable, wherein the first and second transceiver employ Subcarrier Multiplexing, SCM, analogue modulation where baseband is dedicated for monitoring and the subcarriers are dedicated for data transmission, adapted for monitoring the fibre cable is provided. The first transceiver comprises a receiving unit adapted for receiving, from a device, at least one electromagnetic data signal to be transmitted towards the second transceiver on the fibre cable; and a shifting unit adapted for shifting the at least one data signal in the frequency domain. The first transceiver further comprises a generating unit adapted for generating an electromagnetic test signal in a base band, and a combining unit adapted for combining the at least one data signal and generated test signal. Further, the first transceiver comprises a modulating unit adapted for modulating the combined data signal and test signal to respective optical subcarriers and carrier baseband; and a transmitting unit adapted for transmitting the modulated data signal and generated test signal on the fibre cable towards the second transceiver.

The first transceiver and the method performed by the first transceiver may have several advantages. One possible advantage is that the required hardware arrangement can be integrated into a single optical module (a.k.a. transceiver) which transmits data signals on subcarriers and test signal in baseband. The method may be able to provide sufficiently high dynamic range for monitoring based on reflectometry techniques. The method may be implemented in one single node, i.e. the first transceiver, without affecting other nodes or devices to which the first transceiver may be connected.

BRIEF DESCRIPTION OF DRAWINGS

Embodiments will now be described in more detail in relation to the accompanying drawings, in which.

DETAILED DESCRIPTION

Briefly described, a first transceiver and a method performed by the first transceiver for monitoring a fibre cable is provided. The first transceiver is connectable to a second transceiver by the fibre cable, wherein the first and second transceiver employ Subcarrier Multiplexing, SCM, analogue modulation where the baseband is dedicated for monitoring and the subcarrier are dedicated for data transmission.

The first transceiver frequency shift data signal(s) to higher frequencies, wherein a test signal is kept in a base band before transmitting the data signal(s) and the test signal on the fibre cable, wherein the back-reflected and/or back-scattered signal stemming from both the data signals and the test signal comprises a high frequency component relating to the back-reflected and/or backscattered signal stemming from the data signal(s) and a base band component stemming from the test signal. By filtering out the base band component stemming from the test signal, the fibre cable may be monitored.

Figure 1A:
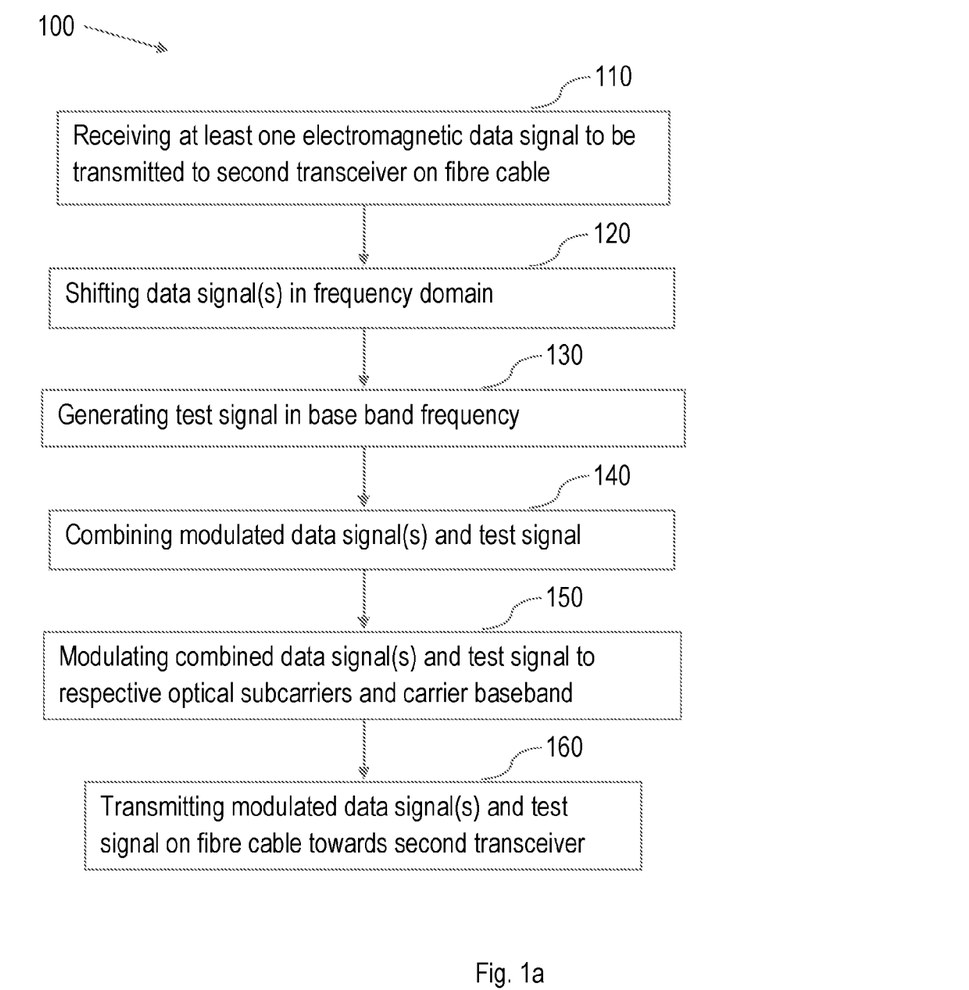
FIG. 1a is a flowchart of a method performed by a first transceiver for monitoring a fibre cable, the transceiver employing Subcarrier Multiplexing, SCM, analogue modulation, according to an exemplifying embodiment.

Embodiments of such a method performed by a first transceiver will now be described with reference to FIG. 1a. The first transceiver is connectable to a second transceiver by the fibre cable, wherein the first and second transceiver employ SCM analogue modulation where the baseband is dedicated for monitoring and the subcarriers are dedicated for data transmission. FIG. 1a illustrates the method comprising receiving 110, from a device, at least one electromagnetic data signal to be transmitted towards the second transceiver on the fibre cable; and shifting 120 the at least one data signal in the frequency domain. The method further comprises generating 130 an electromagnetic test signal in a base band; combining 140 the at least one data signal and the generated test signal; and modulating 150 the combined data signal and test signal to respective optical subcarriers and carrier baseband. The method further comprises transmitting 160 the modulated data signal and generated test signal on the fibre cable towards the second transceiver.

The first transceiver may be connected to a device, e.g. a digital unit, wherein the first transceiver receives one or a plurality of digital electromagnetic data signals. The first transceiver may further be a part of or connected to e.g. an Indoor Radio Unit, IRU, which in turn is connected by a fibre cable a second transceiver. The first transceiver, or the IRU, may be connected to a plurality of second transceivers by means of individual fibre cables.

The first transceiver receives 110, e.g. from the Digital Unit, DU, at least one electromagnetic data signal to be transmitted towards the second transceiver on the fibre cable. The at least one electromagnetic data signal, hereinafter also referred to as electromagnetic data signal(s), will subsequently be transmitted to the second transceiver as optical signals using SCM analogue modulation where the baseband is dedicated for monitoring and the subcarriers are dedicated for data transmission. The first transceiver thus shifts 120 the electromagnetic data signal(s) in the frequency domain to a higher frequency. The first transceiver further generates 130 an electromagnetic test signal in a base band, which thus is lower than the shifted electromagnetic data signal(s). Merely as an example, the higher frequency may be 500 MHz or 5 GHz, but basically any frequency higher than the original frequency of the received electromagnetic data signal.

The first transceiver then combines 140 the at least one data signal and the generated test signal. This may be done e.g. by simply adding them together to one signal comprising all different frequencies of the shifted electromagnetic data signal(s) and the generated test signal. Thereafter, the first transceiver modulates 150 the combined data signal(s) and test signal to respective optical subcarriers and carrier baseband. By modulating the combined data signal(s) and test signal to respective optical subcarriers and carrier baseband, each of the data signals is carried by a respective optical subcarrier having a unique frequency and the test signal is carried by an optical carrier baseband. Thus the electromagnetic signal comprising all different frequencies of the shifted electromagnetic data signal(s) and the generated test signal is transformed to an optical signal having a plurality of subcarriers placed around the nominal wavelength of the optical carrier.

Thereafter, the first transceiver transmits 160 the modulated data signal and generated test signal on the fibre cable towards the second transceiver.

The method performed by the first transceiver may have several advantages. One possible advantage is that the required hardware arrangement can be integrated into a single optical module (a.k.a. transceiver) which transmits data signals on subcarriers and test signal in baseband. The method may be able to provide sufficiently high dynamic range for monitoring based on reflectometry techniques. The method may be implemented in one single node, i.e. the first transceiver, without affecting other nodes or devices to which the first transceiver may be connected.

Figure 1B:
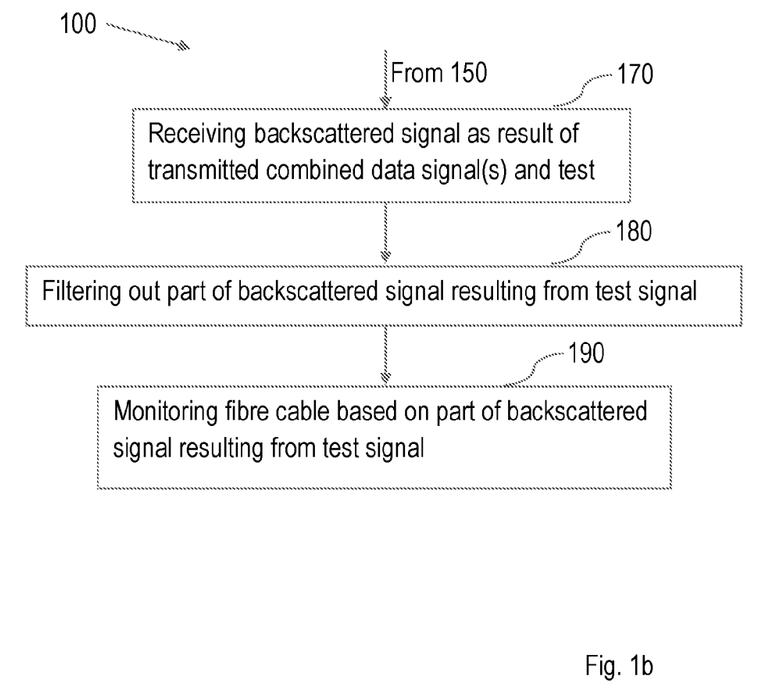
FIG. 1b is a flowchart of a method performed by a first transceiver for monitoring a fibre cable, the transceiver employing SCM analogue modulation, according to an exemplifying embodiment.

The method may further comprise, as illustrated in FIG. 1b, receiving 170 a backscattered and/or back-reflected signal as a result of the transmitted combined least one modulated data signal and the generated test signal; filtering out 180 the part of the backscattered and/or back-reflected signal resulting from the test signal; and monitoring 190 the fibre cable based on the backscattered and/or back-reflected signal resulting from the test signal.

As the transmitted data signal comprising the different subcarriers having different frequencies and the test signal in baseband propagate through the fibre cable towards the second transceiver, fractions of the signal may be backscattered to the first device along the way of the fibre due to Rayleigh scattering and fractions of the signal may be back-reflected as the signal reaches the end of the fibre cable at the second transceiver. It shall be pointed out that the second transceiver does not have to be connected to the fibre cable in order for the signal to be back-reflected. Thus, the fibre cable may be monitored or supervised without having the second transceiver connected to it. However, in order for the second transceiver to receive the data signal(s) destined for the second transceiver, it must be connected to the fibre cable.

The first transceiver will thus receive 170 a backscattered and/or back-reflected signal as a result of the transmitted data signal(s) and the test signal. The received backscattered and/or back-reflected signal may comprise all the frequencies of the transmitted signal comprising the data signal(s) and test signal.

The first transceiver filtering out 180 the part of the backscattered and/or back-reflected signal resulting from the test signal. The part of the backscattered and/or back-reflected signal resulting from the data signal(s) is of no interest, since only the test signal is used for monitoring and/or supervision of the fibre cable. The first transceiver then monitors 190 the fibre cable based on the backscattered and/or back-reflected signal resulting from the test signal. The backscattered and/or back-reflected signal resulting from the test signal may indicate possible faults of the fibre cable which may be detected when monitoring the fibre cable based on the backscattered and/or back-reflected signal resulting from the test signal.

In an example, modulating 150 the combined data signal and test signal comprises generating optical carriers and subcarriers and modulating the generated optical carrier and subcarriers according to the received combined electromagnetic at least one data signal and test signal.

As the frequency shifted data signal(s) and the test signal are combined, a signal comprising different frequencies is obtained. Thus, in order to obtain respective optical subcarriers and carrier baseband, the combined signal is used to generate and modulate the generated optical subcarriers and carrier baseband according to the received combined electromagnetic at least one data signal and test signal. One example is to use the combined signal as an input to a laser diode, wherein the laser diode emits optical power according to injected electrical signal.

In an example, combining 140 the at least one data signal and the generated test signal comprises first separately combining the frequency shifted data signal(s) and secondly combining the test signal with the combined frequency shifted data signal(s).

In this example, the data signal(s), which are frequency shifted, are first combined and thereafter, the test signal is combined with the already combined data signal(s), thus there are two combining operations performed. In another example, the data signal(s) and the test signal are combined in one combining operation.

The method may further comprise converting the backscattered and/or back-reflected signal to a corresponding electromagnetic test signal and converting a received optical signal to a corresponding electromagnetic data signal.

As described above, fractions (or parts) of the transmitted signal comprising the data signal(s) and the test signal are backscattered and/or back-reflected. The part of the backscattered and/or back-reflected signal stemming from the test signal is filtered out and then converted into a corresponding electromagnetic test signal to be used as a basis for monitoring the fibre cable.

The first transceiver may also receive data signal(s) transmitted from the second transceiver. These data signal(s) are also converted to electromagnetic data signal(s) before forwarding them to e.g. the digital unit.

Embodiments herein also relate to a first transceiver connectable to a second transceiver by a fibre cable, wherein the first and second transceiver employ SCM analogue modulation where the baseband is dedicated for monitoring and the subcarriers are dedicated for data transmission, adapted for monitoring the fibre cable.

The first transceiver has the same technical features, objects and advantages as the method performed by the first transceiver. The first transceiver will only be described in brief in order to avoid unnecessary repetition.

Figure 2A:
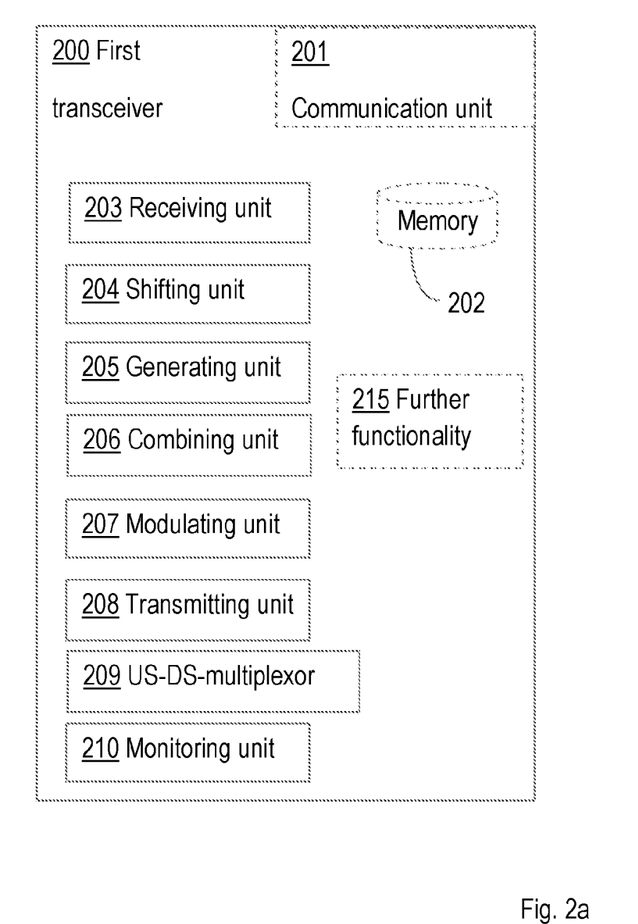
FIG. 2a is a block diagram of a first transceiver for monitoring a fibre cable, the transceiver employing SCM analogue modulation, according to an exemplifying embodiment.

FIG. 2a is a block diagram of a first transceiver for monitoring a fibre cable, the transceiver employing SCM analogue modulation, according to an exemplifying embodiment. FIG. 2a illustrates the first transceiver comprising a receiving unit 203 adapted for receiving, from a device, at least one electromagnetic data signal to be transmitted towards the second transceiver on the fibre cable; and a shifting unit 204 adapted for shifting the at least one data signal in the frequency domain. The first transceiver further comprises a generating unit 205 adapted for generating an electromagnetic test signal in a base band, and a combining unit 206 adapted for combining the at least one data signal and generated test signal. Further, the first transceiver comprises a modulating unit 207 adapted for modulating the combined data signal and test signal to respective optical subcarriers and carrier baseband; and a transmitting unit 208 adapted for transmitting the modulated data signal and generated test signal on the fibre cable 240 towards the second transceiver 230.

FIG. 2a is illustrated comprising further functionality 215. Further functionality may be components that are intentionally left out for the sake of clarity of FIGS. 2a-2d, e.g. laser drivers.

The first transceiver has the same possible advantages as the method performed by the first transceiver. One possible advantage is that the required hardware arrangement can be integrated into a single optical module (a.k.a. transceiver) which transmits data signals on subcarriers and test signal in baseband. The method may be able to provide sufficiently high dynamic range for monitoring based on reflectometry techniques. The method may be implemented in one single node, i.e. the first transceiver, without affecting other nodes or devices to which the first transceiver may be connected.

In an example, the receiving unit 203 further is adapted for receiving a backscattered and/or back-reflected signal as a result of the transmitted combined least one modulated data signal and the generated test signal, and the first transceiver further comprises an upstream-downstream-multiplexor 209 adapted for filtering out the part of the backscattered and/or back-reflected signal resulting from the test signal; and a monitoring unit 210 adapted for monitoring the fibre cable 240 based on the backscattered and/or back-reflected signal resulting from the test signal.

Looking for example at FIG. 2b, the first transceiver is illustrated comprising the receiving unit 203 indicated by the dotted oval, the shifting unit 204, which will be explained in more detail below, and the combining unit 206. The first transceiver further is illustrated comprising the upstream-downstream-multiplexor 209. The upstream-downstream-multiplexor 209 is connected to the modulating unit 207, the fibre cable 240 and two photo diodes 221a and 221b which will be explained in more detail below.

The upstream-downstream-multiplexor 209 is adapted to receive the combined and modulated data signal(s) and test signals from the modulating unit 207 and to output the received signal on the fibre cable 240 towards the second transceiver 230. The upstream-downstream-multiplexor 209 is adapted to receive the backscattered and/or back-reflected signal and also data signal(s) transmitted from the second transceiver 230. When the upstream-downstream-multiplexor 209 receives the backscattered and/or back-reflected signal, the upstream-downstream-multiplexor 209 is adapted to filter out the part of the backscattered and/or back-reflected signal resulting from the test signal and then to forward the part of the backscattered and/or back-reflected signal resulting from the test signal to the monitoring unit 210 via a photo diode 221a. The monitoring unit 210 is only illustrated in FIG. 2a; and in FIGS. 2b-2d, a dotted line from a box denoted 222 illustrates the part of the backscattered and/or back-reflected signal resulting from the test signal being forwarded to the monitoring unit 210. Box 222 will be explained in more detail below.

The upstream-downstream-multiplexor 209 is also adapted to receive optical data signals from the second transceiver 230 and to forward the received optical data signals, via a photo diode 221b, to e.g. the digital unit (not shown).

According to an embodiment, the modulating unit 207 comprises a laser diode 220 adapted for generating optical carrier and subcarriers and modulating the generated optical carrier and subcarriers according to the received combined electromagnetic at least one data signal and test signal.

The laser diode 220 may thus be comprised in the modulating unit 207 and the laser diode 207 emits optical power according to an injected electrical signal. As can be seen in FIGS. 2b-2d, the laser diode gets as an input the electromagnetic combined data signal(s) and test signal from the combining unit 206. The laser diode 220 outputs optical carriers corresponding to the electromagnetic frequencies towards the upstream-downstream-multiplexor 209.

According to an embodiment, the receiving unit 203 comprises a respective input for each of the at least one data signal and the test signal, wherein at least the inputs for the at least one data signal comprises an individual shifting unit 204

Figure 2B:
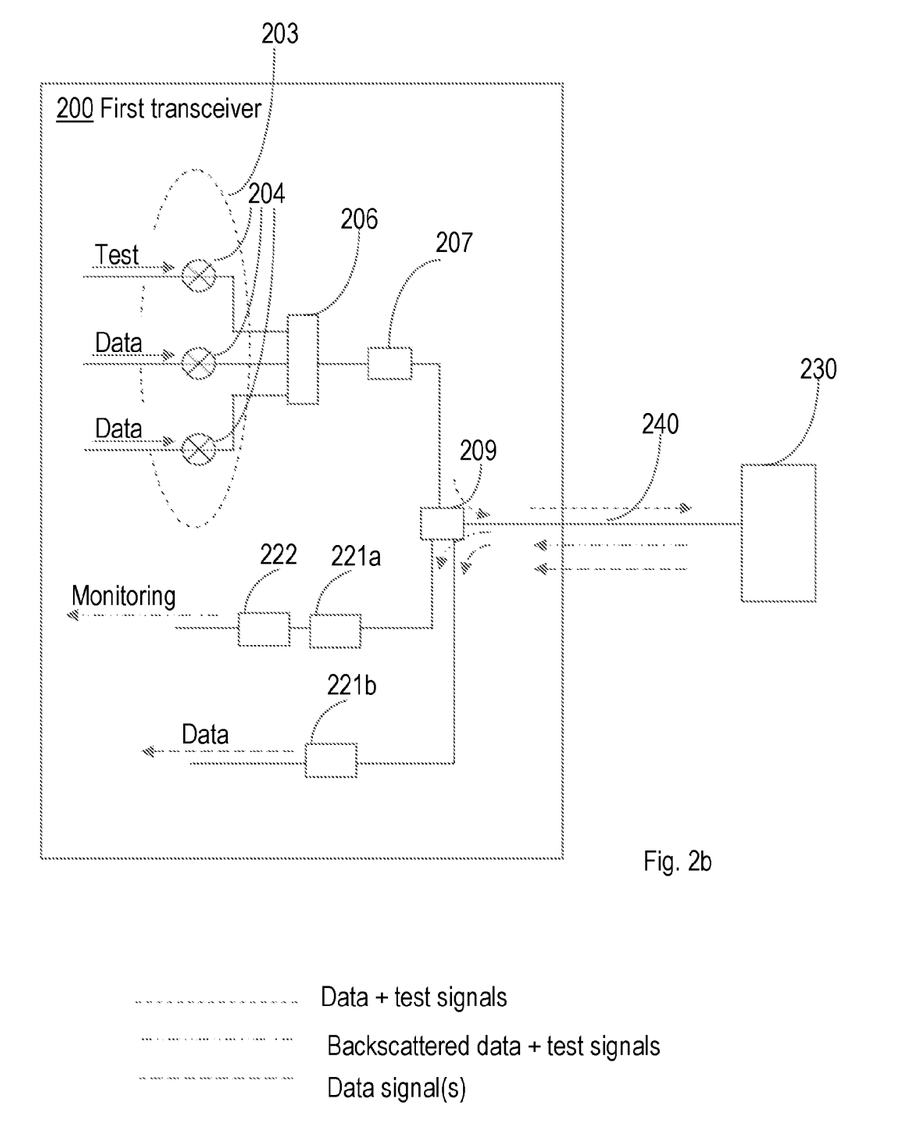
FIG. 2b is a block diagram of a first transceiver for monitoring a fibre cable, the transceiver employing SCM analogue modulation, according to still an exemplifying embodiment.
Figure 2C:
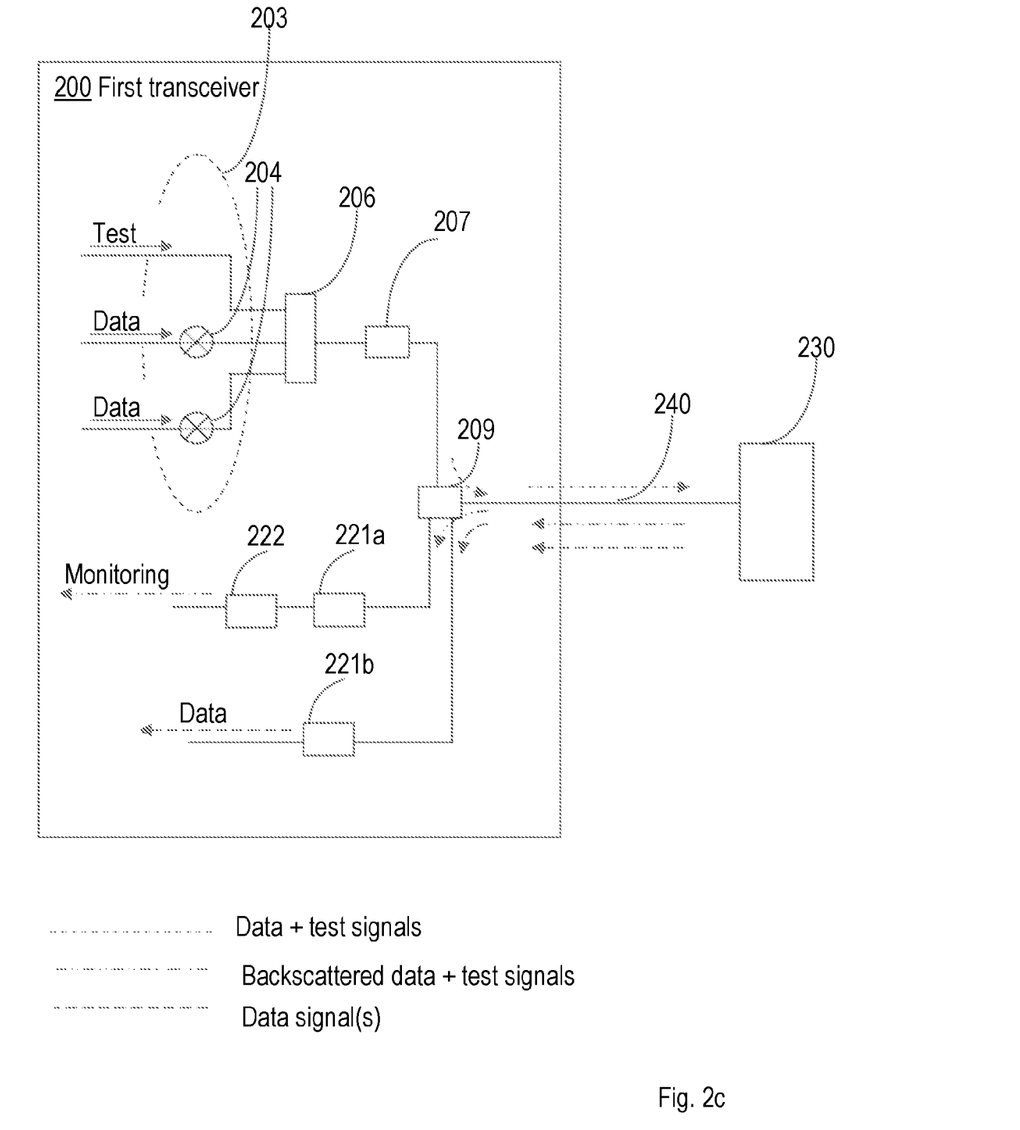
FIG. 2c is a block diagram of a first transceiver for monitoring a fibre cable, the transceiver employing SCM analogue modulation, according to yet an exemplifying embodiment.
Figure 2D:
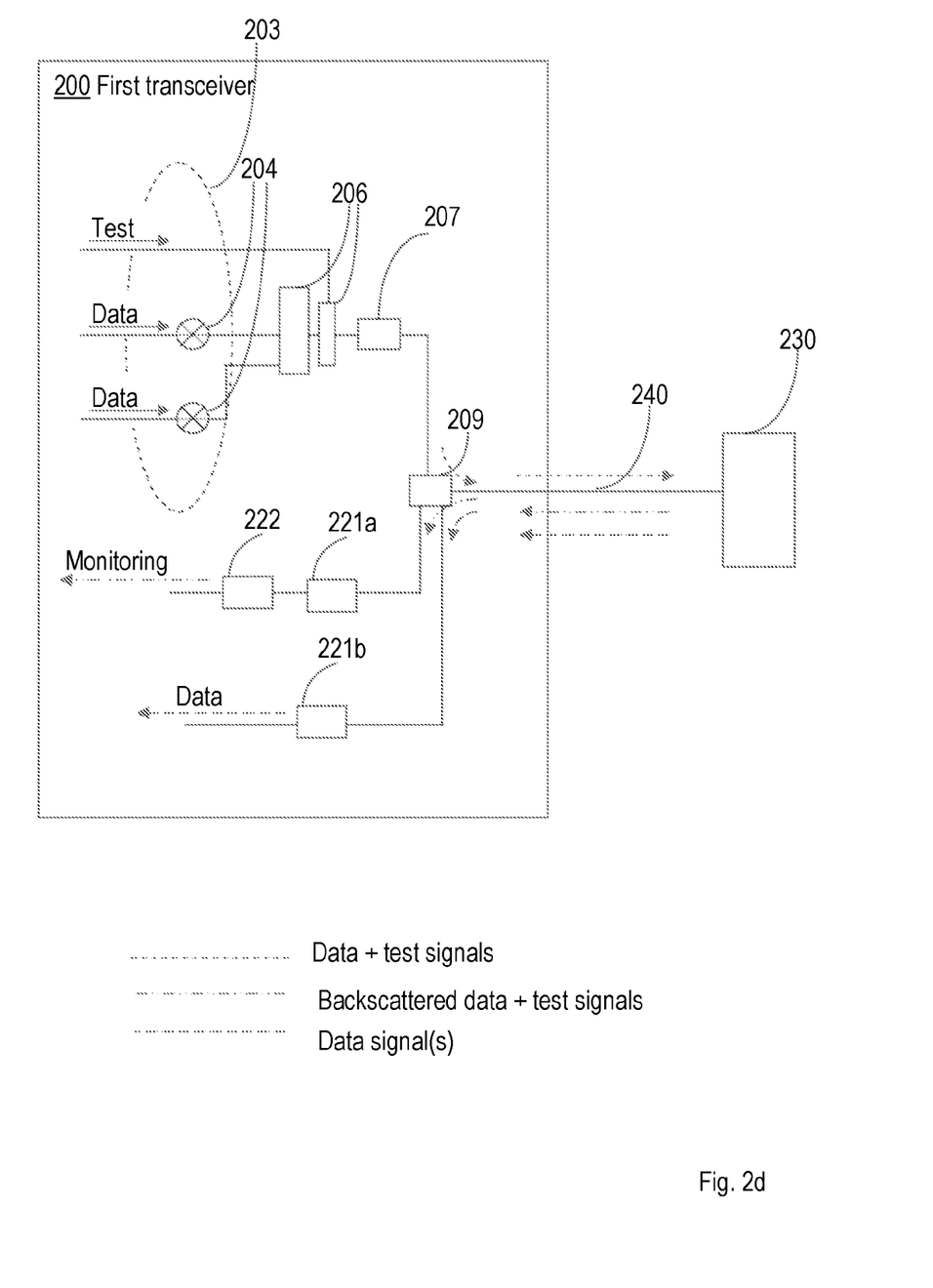
FIG. 2d is a block diagram of a first transceiver for monitoring a fibre cable, the transceiver employing SCM analogue modulation, according to a further exemplifying embodiment.

FIGS. 2b-2d illustrates different exemplifying implementations or embodiments of the transceiver illustrated in FIG. 2a. In FIGS. 2b-2d, the receiving unit 203 is illustrated by a dotted oval. In FIGS. 2b-2d, the receiving unit 203 is illustrated comprising a respective input for each of the at least one data signal and the test signal. In FIG. 2b, the input carrying the test signal is illustrated also comprising a shifting unit 204. However, as described above, only the data signals should be frequency shifted, thus in FIG. 2b, the shifting unit of the input carrying the test signal should be switched off. This also means that in FIG. 2b, the test signal can be carried by any of the input as long as the shifting unit 204 is switched off, and in case there is no test signal, the input unit may carry data signals on all inputs.

In FIGS. 2c and 2d, there is one input which is dedicated for the test signal and this dedicated input lacks a shifting unit 204.

According to an embodiment, the combining unit 206 comprises two individual combiners, a first combiner for combining the at least one frequency shifted data signal and a second combiner for combining the test signal with the combined at least one frequency shifted data signal.

FIG. 2d illustrates this embodiment. Here, the first transceiver is illustrated having a combining unit 206 comprising two individual combiners. The first combiner, to the left in the figure, has as inputs the data signals, after the respective shifting units 204, and is adapted for combining the inputted frequency shifted data signals. The first combiner then outputs the combined data signals to one input of the second combiner, illustrated to the right of the first combiner in the figure. The second combiner has two inputs, one connected to the output of the first combiner and another connected to the input carrying the test signal. Thus the second combiner combines the already combined data signals with the test signals and outputs a combined signal comprising the data signals and the test signal to the laser diode 207.

Neither of FIGS. 2b-2d illustrates the generating unit 205 of FIG. 2a adapted for generating the test signal. In FIGS. 2b-2d, the receiving unit 203 is illustrated comprising an input carrying the test signal, thus the generating unit 205 may be "located" to the left of the receiving unit 203 in FIGS. 2b-2d.

In FIGS. 2b and 2c, the combining unit 206 comprises one combiner which is adapted to receive the frequency shifted data signals and the test signal and combining them all together to one combined signal comprising the frequency shifted data signals and the test signal.

According to an embodiment, the upstream-downstream-multiplexor 209 is adapted for receiving, from the combining unit 206 via the modulating unit 207, the combined at least one data signal and the generated test signal; transmitting the combined at least one data signal and the generated test signal on the fibre cable 240 to the second transceiver 230; receiving, from the second transceiver 230, the backscattered and/or back-reflected signal as a result of the transmitted combined least one data signal and the generated test signal; filtering out the part of the backscattered and/or back-reflected signal resulting from the test signal, and outputting the part towards a first photo diode 221a; and receiving, from the second transceiver, a data signal and outputting the data signal to a second photo diode 221b.

This has been explained above. The respective photo diodes 221a and 221b are adapted to transform the received optical signals, data signals from the second transceiver and backscattered and/or back-reflected signal as a result of the transmitted combined least one data signal and the generated test signal, to electromagnetic signals.

According to yet an embodiment, the two photo diodes 221a, 221b are both connected to the upstream-downstream-multiplexor, wherein the first photo diode 221a is adapted for converting the backscattered and/or back-reflected signal to a corresponding electromagnetic test signal and the second photo diode 221b is adapted for converting a received optical data signal to a corresponding electromagnetic data signal.

According to still an embodiment, the first transceiver 200 further comprises a low pass filter 222 connected to an output of the first photo diode 221a and adapted to supress the part of the backscattered and/or back-reflected signal resulting from the at least one data signal and only letting the part of the backscattered and/or back-reflected signal resulting from the test signal pass through.

Since the backscattered and/or back-reflected signal results from the transmitted combined signal comprising the data signal(s) and the test signal, the parts resulting from the data signal(s) should be removed from the backscattered and/or back-reflected signal. The data signal(s) were frequency shifted to a higher frequency whereas the test signal was kept in the base band. Thus, in order to remove the parts resulting from the data signal(s) of the backscattered and/or back-reflected signal, the low pass filter 222 is arranged after, and connected to, the output of the first photo diode 221a. In this manner, the part of the backscattered and/or back-reflected signal resulting from the test signal is passed through the low pass filter 222 and outputted towards the monitoring unit 210.

The test signal may be generated according different reflectometry techniques, e.g. Optical Time Domain Reflectometry, OTDR, and Optical Frequency Domain Reflectometry, OFDR, and possible other techniques may be applicable.

The solution described above may be equally applicable to Wavelength Division Multiplexed, WDM, systems where baseband of each SCM wavelength channel is used for link monitoring. Such situation may appear in WDM-Passive Optical Networks, PONs, and alike where dedicated wavelengths propagate in individual fibre sections.

Using baseband of the optical carrier imposes a risk of increased noise level. The noise level depends on Radio Frequency, RF, power provided for baseband (e.g. OTDR pulse) modulation. If it is sufficiently lower than RF power for subcarriers, SC, and on top of that if the bandwidth of the baseband signal is sufficiently higher than the bandwidth of the SC signal, the "envelope" coming from the baseband signal added to the data signal from SC may be minimized. Therefore, potential power penalty may become negligible/acceptable.

However, lowering the RF for baseband modulation would lower the dynamic range for line test measurement such as e.g. OTDR, but for less demanding network architectures comparing to e.g. 30 km-reach and 1:32-split PON, relaxed dynamic range requirements could potentially be accepted.

In order to enable Single Ended Line/Loop Testing, SELT, functionality in SCM system, a special transceiver is required. A general exemplifying embodiment is illustrated in FIG. 2a and three exemplifying implementations are illustrated in FIGS. 2b, 2c and 2d.

The first exemplifying implementation is depicted in FIG. 2b, where the test signal is applied to one of the branches for the data signals (transmitter type A, TX-A). In this case, baseband modulation is achieved by switching off a local oscillator 204, the Local Oscillator, LO, being an example of the shifting unit. However, this implementation imposes requirements on filter network design in the mixing stage in order to enable baseband pass through the passive mixing stage (LO off), which in turn may further determine the choice of mixing frequency for data transmission. A second implementation is depicted in FIG. 2c, where the test signal is applied to a dedicated monitoring branch/input where no mixing circuitry is present (transmitter type B, TX-B). In the third implementation, depicted in FIG. 2d, the test signal is added to the SCM data signal (transmitter type C, TX-C).

Figure 2E:
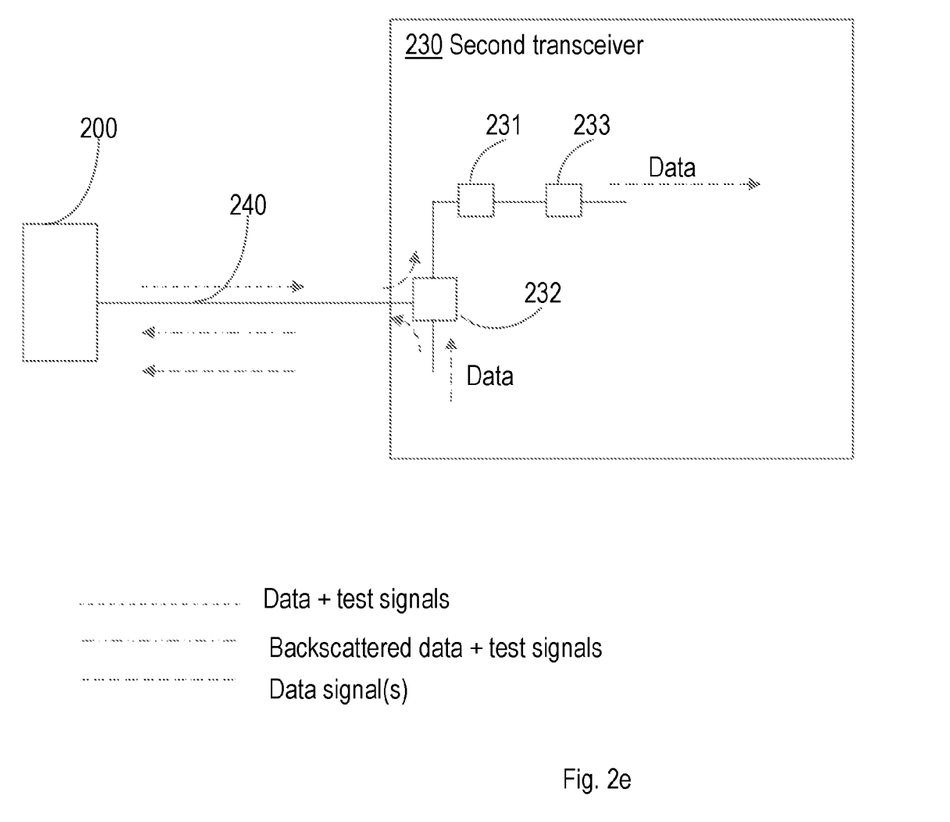
FIG. 2e is a block diagram of a second transceiver connectable to a first transceiver by means of a fibre cable, according to an exemplifying embodiment.

Monitoring signal originating from any type of the transmitter (TX-A, TX-B or TX-C) requires one kind of receiver/transceiver (basically a photo diode with low pass filter) illustrated in FIG. 2e as the second transceiver, which is a dedicated additional component in order to secure in-service monitoring (upstream data signal propagating on a different wavelength may have its own dedicated receiver). Combining of the downstream signal and returned monitoring signal and upstream data signal as well as separation of the last two can be provided by different solutions not specified here.

FIG. 2e illustrates the second transceiver comprising an upstream-downstream-multiplexor 232. The upstream-downstream-multiplexor 232 is adapted to receive the combined signal comprising the data signals and the test signal, and to forward the combined signal to a photo diode 231. The upstream-downstream-multiplexor 232 is also adapted to receive (from an entity e.g. a laser diode, within or connected to the second transceiver) optical data signals to be transmitted to the first transceiver 200 on the fibre cable 240; and to forward such data signals to the first transceiver 200 by outputting them on the fibre cable 240. The photo diode 231 is adapted to convert the optical combined signal to an electromagnetic combined signal comprising the frequency shifted data signals and the test signal. The second transceiver 230 further comprises a high pass filter 233 adapted to remove the test signal from the combined signal and only let the combined frequency shifted data signals pass through.

It should be noted that FIG. 2a merely illustrates various functional units in the first transceiver in a logical sense. The functions in practice may be implemented using any suitable software and hardware means/circuits etc. Thus, the embodiments are generally not limited to the shown structures of the first transceiver and the functional units of FIG. 2a. Hence, the previously described exemplary embodiments may be realized in many ways. For example, as illustrated in the three exemplifying embodiments of FIGS. 2b, 2c and 2d.

While the embodiments have been described in terms of several embodiments, it is contemplated that alternatives, modifications, permutations and equivalents thereof will become apparent upon reading of the specifications and study of the drawings. It is therefore intended that the following appended claims include such alternatives, modifications, permutations and equivalents as fall within the scope of the embodiments and defined by the pending claims.

The invention claimed is:

1. A method performed by a first transceiver connectable to a second transceiver by a fibre cable, wherein the first and second transceiver employ Subcarrier Multiplexing (SCM) analogue modulation where baseband is dedicated for monitoring and the subcarriers are dedicated for data transmission, for monitoring the fibre cable, the method comprising:
receiving, from a device, at least one electromagnetic data signal to be transmitted towards the second transceiver on the fibre cable;
shifting the at least one data signal in the frequency domain;
generating, utilizing at least one electric local oscillator, an electromagnetic SCM test signal in a base band;
combining, utilizing an electric combiner, the at least one shifted data signal and the generated SCM test signal to produce a combined signal;
modulating the combined signal to respective optical subcarriers and carrier baseband; and
transmitting the modulated combined signal on the fibre cable towards the second transceiver, wherein the modulated combined signal is transmitted without impacting contents of standardized frames or changing the carrier.

2. The method according to claim 1, further comprising:
receiving a backscattered and/or back-reflected signal as a result of the transmitted combined signal;
filtering out the part of the backscattered and/or back-reflected signal resulting from the test signal; and
monitoring the fibre cable based on the backscattered and/or back-reflected signal resulting from the test signal.

3. The method according to claim 1, wherein modulating the combined signal comprises generating optical carrier and subcarriers and modulating the generated optical carrier and subcarriers according to the received combined electromagnetic at least one data signal and test signal.

4. The method according to claim 1, wherein combining the at least one shifted data signal and the generated SCM test signal comprises first separately combining the frequency shifted data signal(s) and secondly combining the test signal with the combined frequency shifted data signal(s).

5. The method according to claim 1, further comprising converting the backscattered and/or back-reflected signal to a corresponding electromagnetic test signal and converting a received optical signal to a corresponding electromagnetic data signal.

6. A first transceiver connectable to a second transceiver by a fibre cable, wherein the first and second transceiver employ Subcarrier Multiplexing (SCM) analogue modulation where baseband is dedicated for monitoring and the subcarriers are dedicated for data transmission, adapted for monitoring the fibre cable, the first transceiver comprising:
a receiving unit adapted for receiving, from a device, at least one electromagnetic data signal to be transmitted towards the second transceiver on the fibre cable;
a shifting unit adapted for shifting the at least one data signal in the frequency domain;
a generating unit adapted for generating, utilizing at least one electric local oscillator, an electromagnetic SCM test signal in a base band;
a combining unit adapted for combining, utilizing an electric combiner, the at least one shifted data signal and the generated SCM test signal to produce a combined signal;
a modulating unit adapted for modulating the combined signal to respective optical subcarriers and carrier baseband; and a transmitting unit adapted for transmitting the modulated combined signal on the fibre cable towards the second transceiver, wherein the modulated combined signal is transmitted without impacting contents of standardized frames or changing the carrier.

7. The first transceiver according to claim 6, wherein the receiving unit further is adapted for receiving a backscattered and/or back-reflected signal as a result of the transmitted combined signal, the first transceiver further comprising:
- an upstream-downstream-multiplexor adapted for filtering out the part of the backscattered and/or back-reflected signal resulting from the test signal; and
- a monitoring unit adapted for monitoring the fibre cable based on the backscattered and/or back-reflected signal resulting from the test signal.

8. The first transceiver according to claim 7, wherein the upstream-downstream-multiplexor is adapted for:
- receiving, from the combining unit via the modulating unit, the combined signal;
- transmitting the combined signal on the fibre cable to the second transceiver;
- receiving, from the second transceiver, the backscattered and/or back-reflected signal as a result of the transmitted combined signal;
- filtering out the out the part of the backscattered and/or back-reflected signal resulting from the test signal, and outputting the part towards a first photo diode; and
- receiving, from the second transceiver, a data signal and outputting the data signal to a second photo diode.

9. The first transceiver according to claim 8, further comprising two photo diodes connected to the upstream-downstream-multiplexor, wherein the first photo diode is adapted for converting the backscattered and/or back-reflected signal to a corresponding electromagnetic test signal and the second photo diode is adapted for converting a received optical data signal to a corresponding electromagnetic data signal.

10. The first transceiver according to claim 9, further comprising a low pass filter connected to an output of the first photo diode and adapted to suppress the part of the backscattered and/or back-reflected signal resulting from the at least one data signal and only letting the part of the backscattered and/or back-reflected signal resulting from the test signal pass through.

11. The first transceiver according to claim 6, wherein the modulating unit comprises a laser diode adapted for generating optical carrier and subcarriers and modulating the generated optical carrier and subcarriers according to the combined signal.

12. The first transceiver according to claim 6, wherein the receiving unit comprises a respective input for each of the at least one data signal and the test signal, wherein at least the inputs for the at least one data signal comprises an individual shifting unit.

13. The first transceiver according to claim 6, wherein the combining unit comprises two individual combiners, a first combiner for combining the at least one frequency shifted data signal and a second combiner for combining the test signal with the combined at least one frequency shifted data signal.

* * * * *